US009954987B2

(12) United States Patent
Yang et al.

(10) Patent No.: US 9,954,987 B2
(45) Date of Patent: Apr. 24, 2018

(54) REMOTE CONTROLLER UTILIZED WITH CHARGING DOCK FOR CONTROLLING MOBILE DEVICE

(71) Applicant: Analogix Semiconductor, Inc., Santa Clara, CA (US)

(72) Inventors: Kewei Yang, Saratoga, CA (US); André Bouwer, San Jose, CA (US); Marvin Su, Palo Alto, CA (US); Soumendra Mohanty, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 14/624,521

(22) Filed: Feb. 17, 2015

(65) Prior Publication Data

US 2016/0165026 A1    Jun. 9, 2016

Related U.S. Application Data

(60) Provisional application No. 62/087,706, filed on Dec. 4, 2014.

(51) Int. Cl.
*H04M 1/04* (2006.01)
*G06F 1/16* (2006.01)
*H04M 1/725* (2006.01)

(52) U.S. Cl.
CPC ............ *H04M 1/04* (2013.01); *G06F 1/1632* (2013.01); *H04M 1/72527* (2013.01)

(58) Field of Classification Search
CPC ............. H04W 88/02; H04M 1/72527; H04M 1/7253; H04M 1/725; H04M 1/04; G06F 1/1632
See application file for complete search history.

(56) References Cited

U.S. PATENT DOCUMENTS

D297,316 S    8/1988  Mastro
D324,514 S    3/1992  Ishida
(Continued)

FOREIGN PATENT DOCUMENTS

CN    303454038    11/2015
CN    303542283    1/2016
(Continued)

OTHER PUBLICATIONS

Notice of Allowance dated Aug. 25, 2015 in Chinese Application No. 201530187861.0, filed Jun. 10, 2015.
(Continued)

*Primary Examiner* — Ted Wang
(74) *Attorney, Agent, or Firm* — Carr & Ferrell LLP (57) ABSTRACT

Provided is a console unit for controlling a mobile device. The console unit includes a remote control unit and a tower section. The tower section includes a receptacle adapted for receiving the remote control unit at least partially therein. The tower section further includes a housing and an interface configured for coupling to the mobile device. The interface is configured for selectively receiving high definition media data and USB protocol data from the mobile device and for charging the mobile device. The tower section includes at least one media port for providing the high definition media data to a media player device and a power port for receiving power. The remote control unit includes a communications transceiver configured to communicate with the mobile device. The remote control unit includes a touchpad for receiving input from a user, including gestures, while the mobile device is coupled to the tower section.

21 Claims, 6 Drawing Sheets

(56) References Cited

U.S. PATENT DOCUMENTS

| | | | |
|---|---|---|---|
| 6,057,788 A | | 5/2000 | Cummings |
| D533,177 S | | 12/2006 | Andre et al. |
| D537,817 S | | 3/2007 | Andre et al. |
| D542,288 S | | 5/2007 | Andre et al. |
| D596,626 S | | 7/2009 | Andre et al. |
| D601,583 S | | 10/2009 | Andre et al. |
| D620,953 S | | 8/2010 | Andre et al. |
| D624,541 S | | 9/2010 | Kemery et al. |
| D628,143 S | | 11/2010 | Riddiford |
| D662,496 S | | 6/2012 | Lewis et al. |
| D676,005 S | | 2/2013 | Wood et al. |
| D686,201 S | | 7/2013 | Lee |
| D686,595 S | | 7/2013 | Andre et al. |
| D700,502 S | | 3/2014 | Smith |
| D705,201 S | | 5/2014 | Isaacs et al. |
| D706,249 S | | 6/2014 | Holzer |
| D716,363 S | | 10/2014 | Apter |
| D724,583 S | | 3/2015 | Ge |
| D726,690 S | | 4/2015 | Andre et al. |
| D727,360 S | | 4/2015 | Peng et al. |
| D736,191 S | | 8/2015 | Jeon et al. |
| D739,857 S | | 9/2015 | Lay et al. |
| D742,856 S | | 11/2015 | Skjoldborg et al. |
| D745,480 S | | 12/2015 | Mathews et al. |
| D748,639 S | | 2/2016 | Khodapanah et al. |
| D749,596 S | | 2/2016 | Khodapanah et al. |
| D754,110 S | | 4/2016 | Jung et al. |
| D755,880 S | | 5/2016 | Luo et al. |
| 9,389,698 B2 | | 7/2016 | Bouwer et al. |
| D762,734 S | | 8/2016 | Kwong |
| D765,140 S | | 8/2016 | Peng et al. |
| D766,218 S | | 9/2016 | Yang et al. |
| D775,627 S | | 1/2017 | Yang et al. |
| 2003/0094354 A1 | | 5/2003 | Badarneh |
| 2005/0025549 A1 | | 2/2005 | McLoone |
| 2008/0138028 A1 | * | 6/2008 | Grady .................. H04N 1/00299 386/291 |
| 2010/0057882 A1 | | 3/2010 | Haartsen et al. |
| 2010/0235552 A1 | | 9/2010 | Holden et al. |
| 2011/0312272 A1 | | 12/2011 | Goto et al. |
| 2014/0104183 A1 | * | 4/2014 | Caron .................... G08C 17/02 345/173 |
| 2014/0123253 A1 | * | 5/2014 | Davis .................... G06F 21/316 726/6 |
| 2014/0132497 A1 | | 5/2014 | Kolehmainen |
| 2014/0173584 A1 | * | 6/2014 | Gayrard .................. G06F 8/71 717/170 |
| 2014/0184471 A1 | * | 7/2014 | Martynov ............. G06F 3/1423 345/1.2 |
| 2014/0217816 A1 | * | 8/2014 | Okada .................... H02J 7/025 307/10.1 |
| 2014/0267932 A1 | | 9/2014 | Riddell et al. |
| 2015/0029120 A1 | * | 1/2015 | Sieckmann ............ G02B 21/24 345/173 |
| 2015/0042447 A1 | | 2/2015 | Vogt et al. |
| 2015/0095786 A1 | | 4/2015 | Kreiner et al. |
| 2015/0187147 A1 | * | 7/2015 | Tieman .................... G07C 5/08 701/33.2 |
| 2015/0277744 A1 | | 10/2015 | Tang |
| 2015/0326707 A1 | | 11/2015 | Lee et al. |
| 2016/0162035 A1 | | 6/2016 | Bouwer et al. |
| 2017/0242562 A1 | | 8/2017 | Bouwer et al. |

FOREIGN PATENT DOCUMENTS

| | | |
|---|---|---|
| JP | D1440208 S | 5/2012 |
| JP | D1467865 S | 5/2013 |
| TW | D180522 S | 1/2017 |
| WO | WODM088070 | 10/2015 |
| WO | WODM077070 | 4/2016 |
| WO | WODM088070 | 5/2016 |
| WO | WO2017142816 A | 8/2017 |

OTHER PUBLICATIONS

Notice of Allowance dated Oct. 15, 2015 in Chinese Application No. 201530187611.7, filed Jun. 10, 2015.

"Search Report for Design Patent Application" and "Allowance Decision" dated Aug. 30, 2016 in Taiwanese Application No. 104306033, filed Oct. 27, 2015, 3 pages [4 pages including translation].

Notice of Allowance, dated Oct. 5, 2016, U.S. Appl. No. 29/525,468, filed Apr. 29, 2015.

Notice of Allowance, dated Mar. 21, 2016, U.S. Appl. No. 14/734,950, filed Jun. 9, 2015.

Notice of Allowance, dated May 25, 2016, U.S. Appl. No. 29/525,448, filed Apr. 29, 2015.

Office Action dated Mar. 10, 2016 in Taiwanese Application No. 104306033, filed Oct. 27, 2015.

"Office Action," International Design Application No. DM/088070, dated Nov. 30, 2016, 8 pages.

"Garreffa, Anthony," "Analogix unveils the new Nano-Console, connects your phone and TV," "TweakTown [online], Jan. 9, 2015 [retrieved on Dec. 5, 2016], Retrieved from the Internet: <http://www.tweaktown.com/news/42545/analogix-unveils-new-nano-console-connects-phone-tv/index.html?utm_source=dlvr.t&utm_medium=twitter&utm_campaign=tweaktown>, 3 pages."

Wang, Xin et al., "Devices and Methods for Multiple Data Streams over USB 2.0", U.S. Appl. No. 14/525,124, filed Oct. 27, 2014, 39 pages.

Patent Cooperation Treaty Application No. PCT/US2017/017522, "International Search Report and Written Opinion," dated May 22, 2017, 14 pages.

Non-Final Office Action, dated Dec. 2, 2015, U.S. Appl. No. 14/734,950, filed Jun. 9, 2015.

* cited by examiner

REMOTE CONTROLLER UTILIZED WITH CHARGING DOCK FOR CONTROLLING MOBILE DEVICE

CROSS-REFERENCE TO RELATED APPLICATIONS

The present application claims the benefit of U.S. Provisional Application No. 62/087,706, filed Dec. 4, 2014. The present application is related to U.S. patent application Ser. No. 13/761,013, filed Feb. 6, 2013, and is also related to U.S. patent application Ser. No. 14/525,124, filed Oct. 27, 2014. The subject matter of the aforementioned applications is incorporated herein by reference for all purposes.

FIELD

The present application relates to remote controls, and more specifically to a remote control unit used in conjunction with a dock unit to provide various functionality related to a mobile device.

BACKGROUND

Approaches described in this section should not be assumed to qualify as prior art merely by virtue of their inclusion therein.

Mobile devices are becoming increasingly popular due to their flexibility and ready access to rich content. A mobile device (also be referred to as a mobile phone, a smart phone, a phablet, and a tablet) can be coupled to the charging dock which can receive power (e.g., via a wall outlet) and provide it to the mobile device. For transmitting video data, the mobile device can be physically coupled to a video receiver. Tethering the mobile device thusly can constrain control of the mobile device by a user situated some distance away from the mobile device.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one embodiment of the disclosure, a console unit is provided for controlling a mobile device. According to various example embodiments, the console unit comprises a remote control unit and a tower section. The remote control unit can include a communications transceiver configured to communicate with the mobile device. The tower section can include a receptacle adapted for receiving the remote control unit at least partially therein. The tower section can further include a housing and at least one of the following: an interface configured for coupling to the mobile device, at least one media port for providing high definition media data to at least one media player device, and a power port for coupling the tower section to a power source for receiving power. The interface can be configured to selectively receive high definition media data and USB protocol data from the mobile device. In some embodiments, the interface is further configured for charging the mobile device.

In some embodiments, the interface includes a cable. The cable can include one end coupled to the tower section. The cable can further include another end having a USB protocol connector for coupling to the mobile device. In some embodiments, the tower section includes two media ports. The two media ports may include: at least one HDMI port configured for coupling to an HDMI compatible device; and at least one USB port configured for coupling to a USB compatible device. In some embodiments, at least one of the power port, the media port(s), and the interface includes at least one of an HDMI connector, a DisplayPort connector, and a USB connector. The USB connector may be a USB Type C, micro-USB and other USB type and/or variant.

In some embodiments, the tower station is configured to charge the remote control unit that is disposed at least partially in the receptacle. In certain embodiments, the remote control unit is charged using wireless charging. While the mobile device is coupled to the tower section, the at least one media player may be configured to provide video of a screen of the mobile device (e.g., mirroring).

In some embodiments, the remote control unit is configured to communicate with the mobile device via one of various wireless protocols, including Bluetooth, near field communication (NFC), and WiFi to name a few. As referred to herein, the Bluetooth wireless protocol in exemplary embodiments includes but is not limited to Bluetooth Low Energy (BLE). The remote control unit may include a touchpad for receiving an input from a user while the mobile device is coupled to the tower section. The mobile device can be configured to perform an action associated with the received input. In certain embodiments, the remote control unit can further include one or more buttons for receiving an input from a user while the mobile device is coupled to the tower section.

In some embodiments, each button is associated with at least one of the standard Android buttons (representing "home" etc.). In certain embodiments, the touch screen includes sensitive areas, the sensitive areas being associated with one of the standard Android buttons.

In some embodiments, the input from a user is a gesture. For example, the input gesture is received by depressing (e.g., pushing down) the touchpad by a finger and then moving the finger across the touchpad while keeping the touchpad depressed. In some embodiments, the action to be caused in response to the gesture includes one or more of the following: swiping a screen associated with a user interface of the mobile device; scrolling a portion of a screen associated with the user interface of the mobile device; and typing a letter in a virtual keyboard provided by the user interface of the mobile device.

An exemplary method for controlling a mobile device using a console unit is provided. The console unit can include a remote control unit and a tower section. The remote control unit can include a communications transceiver configured to communicate with the mobile device. The tower section can include a receptacle adapted for receiving the remote control unit at least partially therein. The tower section can further include a housing and at least one of: an interface configured for coupling to the mobile device, at least one media port for providing high definition media data to at least one media player device, and a power port for coupling to a power source for receiving power. The interface can be configured for selectively receiving high definition media data and USB protocol data from the mobile device.

The method can include receiving, via the remote control, an input from a user while the mobile device is connected to the tower section. The method can also include recognizing an action associated with the input. Additionally, the method can include initiating (and/or causing, at least partially) the performing of the action on the mobile device and causing, at least partially, displaying of results of the action via the at least one media player.

According to another example embodiment of the present disclosure, the steps of the method for controlling a mobile device using a console unit can be stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS AND APPENDICES

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technologies disclosed herein provide systems and methods for remote controlling mobile devices via a remote controller utilizing a docking station (also referred to variously herein as a charging station, a charging dock, a charging tower, a docking tower, a dock tower, dock, a tower dock, tower section, and a tower). A remote (which may also be referred to as a remote control, a remote controller, a mobile device remote controller, and a smart phone remote controller) may enable a user to control the mobile device. The docking station can facilitate video display provided by a mobile device to a display device, for example, a television set. In various embodiments, the docking station includes a conversion processor and a remote controller for controlling the mobile device. The docking station can include a receptacle to receive the remote controller and may recharge the remote controller wirelessly or through transmission of power from electrical contacts of the receptacle to electrical contacts of the remote. The remote controller can communicate with the mobile device via Bluetooth, WiFi, or any other suitable communication protocol. In various embodiments, the remote control is locatable at, and removable from, the tower dock, and communicates with the mobile device.

The docking station can provide media data comprising, for example, video and/or audio data, to a media player while the mobile device is plugged into the dock. The media player may be, for example, a high definition TV (HD TV) or ultra-high definition TV (UHD TV, including but not limited to 4K UHD (2160p) and 8K UHD (4320p)).

A mobile device remote controller as described herein can be operable to extend the reach of a smart phone. A smart phone remote controller may control applications running on the smart phone, such as navigating menus and/or controlling video stream playback on the smart phone and/or a media player (e.g., a television or monitor). The mobile device remote controller can be particularly useful when, for example, a mobile phone is not easily reachable, such as during charging and/or while being connected to a media player via a docking station. In some embodiments, the remote controller is connected to the smart phone through various wireless technology (e.g., WiFi, Bluetooth or any other suitable communication protocol), and may have very low power consumption, such that the remote controller does not require charging or battery replacement for a very long time, e.g., up to two to three years. In further embodiments, the smart phone remote controller can be operable to receive incoming phone calls and/or place outgoing phone calls.

According to an example embodiment, a console unit is provided. The console unit can include a remote control unit and a tower section including a receptacle adapted for receiving the remote control unit at least partially therein. The remote control unit can include a communications transceiver configured to communicate with the mobile device. The tower section can further include a housing and at least one of: an interface, at least one media port, and a power port. The interface can be configured for coupling to the mobile device and for selectively receiving high definition media data and USB protocol data from the mobile device. The interface can be further configured for charging the mobile device. The at least one media port can be configured for providing the high definition media data to at least one media player device. The power port can be configured for coupling to a power source for receiving power.

Figure 1:
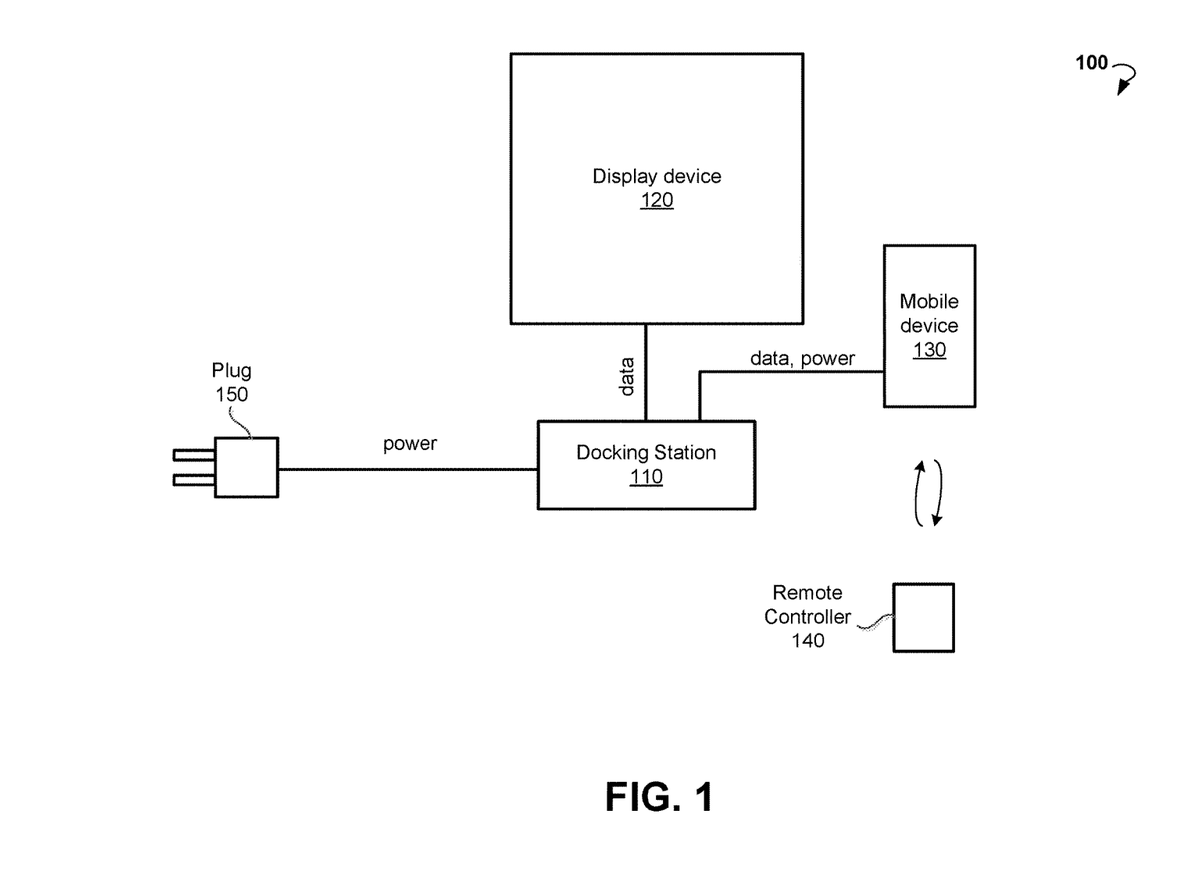
FIG. 1 is a block diagram of an example system for controlling a mobile device via a remote controller utilizing a charging dock, according to an example embodiment.

FIG. 1 is block diagram illustrating a system 100 for remote controlling a mobile device, according to various embodiments of the present technology. In this example, system 100 includes a mobile device 130 coupled to a docking station 110 via a cable. Mobile device 130 can be configured to receive power from docking station 110 for recharging the battery (or batteries) of mobile device 130.

In various embodiments, mobile device 130 provides media data to docking station 110 and can be controlled by remote controller 140. In some embodiments, the media data are provided by docking station 110 to a media player, for example, a display device 120. In various embodiments, docking station 110 is configured to receive power for converting data and for charging mobile device 130 via plug 150, which is insertable into a wall socket or other suitable power source. The remote controller 140 can communicate wirelessly to control a mobile device 130 coupled to the docking station 110. In some embodiments, the remote controller 140 is operable to control any device using a Bluetooth mouse/trackpad HID (human interface device) protocol.

Figure 2:
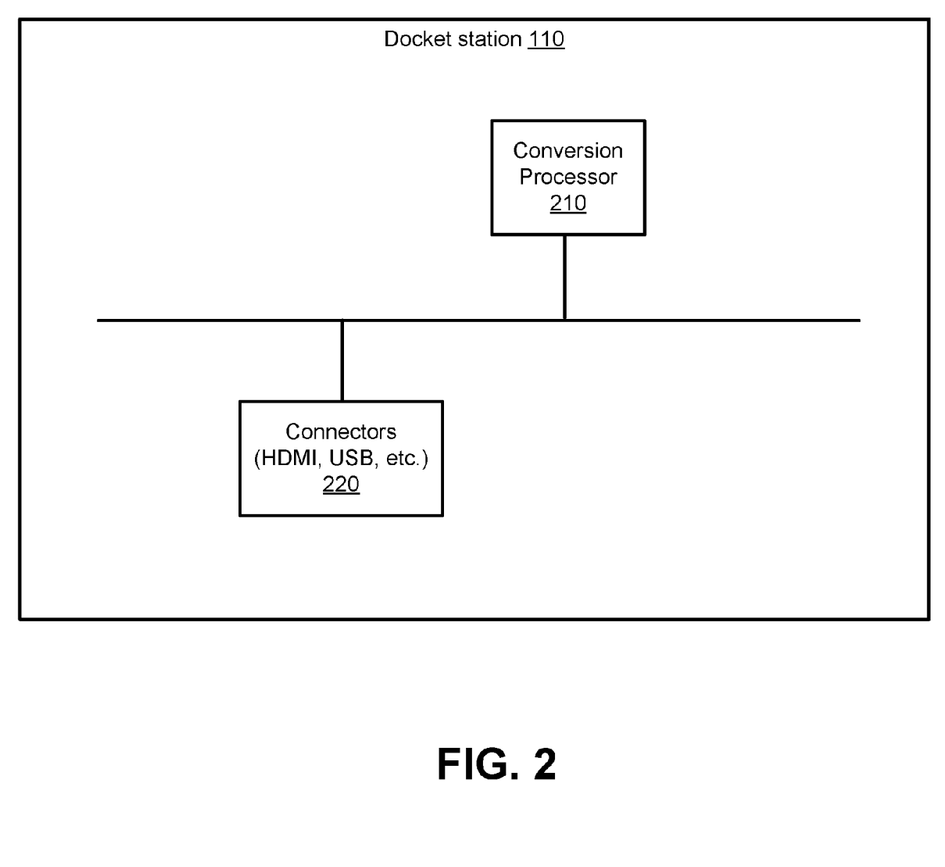
FIG. 2 is a block diagram of an example docking station.

FIG. 2 is a block diagram showing components of a docking station 110, according to various example embodiments. The docking station 110 can include a conversion processor 210 and connectors 220.

Figure 3:
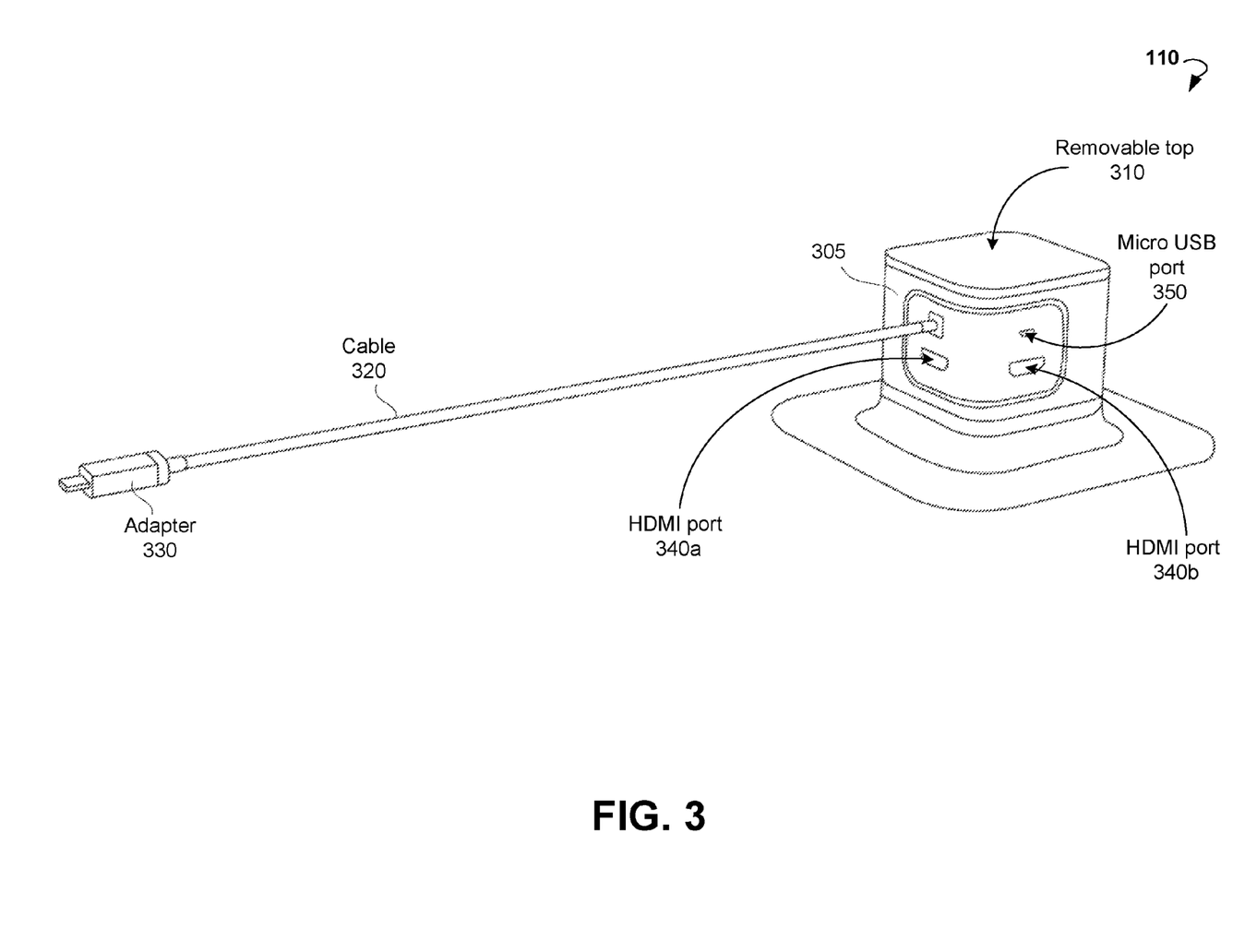
FIG. 3 is a block diagram illustrating a docking station, according to an example embodiment.

FIG. 3 is a block diagram showing an example docking station 110, according to various example embodiments. The example docking station 110 includes a housing 305, a removable top 310, a cable 320, an adapter 330, HDMI ports 340a and 340b, and a micro USB port 350. In various embodiments, the housing 305 of the docking station 110 includes a base and a recess on top of the base (for example, behind the removable top 310), the recess being configured to receive the remote controller 140, e.g., when the remote controller 140 is not being held by a user. In various embodiments, the docking station 110 receives video data (and audio data or any other appropriate media data) via a USB connector (or via any other appropriate device connector) from the mobile device 130 and provides the video data (or other media data) to a media player, via an HDMI connector (or any other appropriate device connector, for example, a USB connector). It should be noted that the video data as referred to herein may include video data only or include both video and audio data, audio/video data being commonly referred to as just video data for short.

In some embodiments, the conversion processor 210 in the docking station 110 is operable to be powered directly from a wall outlet. In certain embodiments, the docking station 110 includes multiple connectors (for example, two HDMI connectors, two USB connectors) for communicating variously with one or more display devices, or other devices (for example, a Chromecast player, and a Blu-Ray player).

Different connectors 220 are possible for different components of the docking station, as well as for different functionalities. In some embodiments, a DisplayPort connector or an HDMI connector, to name just a few, is used for video outputs from the docking station, and a micro-USB or other suitable USB connector may be used for video inputs to and/or video outputs from the docking station.

In some embodiments, multiple USB connections with the docking station can be made, for example, one to the mobile device 130 and one to the display device 120 or other media player, to name just a few.

The docking station 110 may operate using a DisplayPort standard and/or MyDP standard, as a digital audio-video interface as well as a USB 2.0 data interface connectivity between a transmitter (source) device and a receiver (sink) device using a standard 5-pin connector and a protocol. An enhanced protocol may be used, such enhanced protocol can be referred to as Slimport or Slimport Pro, both extensions of DisplayPort. In example embodiments, the transmitter (source) device is the mobile device (e.g., 130 in FIG. 1) coupled via cable 320 to the housing 305 of the docking station 110 (e.g., also referred to herein as a console unit when the remote controller 140 is included instead of, or in addition to, the removeable top 310).

The cable 320 may include the adapter 330 configured for providing the operability of the protocol, e.g., the enhanced protocol. Further description of an exemplary cable is found in U.S. patent application Ser. No. 14/525,124, filed Oct. 27, 2014, which is incorporated by reference herein. In some embodiments, the enhanced protocol functionality provided by the adapter 330 and cable 320, may be provided instead within the dock station housing.

Figure 4:
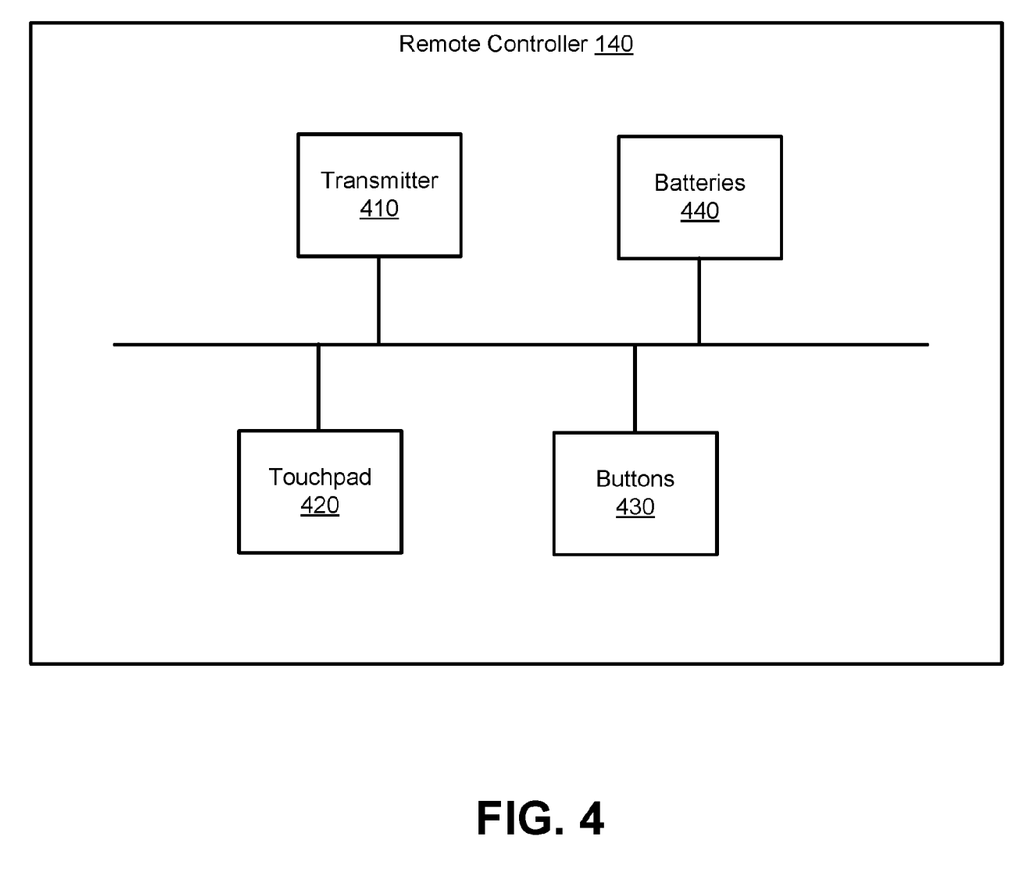
FIG. 4 is a block diagram of an example remote controller.

FIG. 4 is a block diagram showing remote controller 140, according to various example embodiments. The remote controller 140 can include a transmitter 410, a touchpad 420, buttons 430, and batteries 440. The transmitter can be configured to communicate wirelessly with the mobile device 130 via Bluetooth, WiFi, or any other suitable communication protocol.

In some embodiments, the touchpad 420 and various buttons 430 are operable to receive user input. An example arrangement of the buttons can include three buttons associated with the Android operating system (Home, Back and Settings/application launcher). The user interface using the touchpad 420 may include various advantageous configurations.

In one example embodiment, the touchpad remote control is configured to allow a user to control a mobile device's user interface while the mobile device is connected to the docking station. Using the remote controller, the user can perform actions on the mobile device screen or the video displayed on a big screen by the mobile device via docking station 110.

In other embodiments, the "buttons" on the remote controller are accessible while the remote controller 140 is positioned on the receptacle (e.g., in the recess) at the top of the docking station 110. In particular, the remote controller can be accessible by a user when the remote is positioned, at least partially, in the receptacle of the docking station 110 and allow the user to access the buttons and touchpad in this position. The remote controller 140 can receive these inputs and controls of the mobile device while being positioned, at least partially, in the receptacle of the docking station.

In various embodiments, the shape of the remote controller 140 is designed to blend into the shape of docking station 110 to create an integrated appearance when the remote controller 140 is disposed, at least partially, on or in the receptacle of the docking station 110.

In some embodiments, in order to perform an action on the mobile device remotely, the user can first clicks on the touchpad 420, for instance, by pushing a micro-switch underneath the touchpad with a thumb to actuate the micro-switch. Thereafter, while the user's thumb is still on the trackpad and the "click" is still activated, the user can move a thumb across the trackpad to perform the action on the mobile device. After completing the action, the user may remove the thumb from the touchpad for disengaging the micro-switch.

In some embodiment, the action includes a "swipe" action for swiping to other screens of the mobile device's user interface, for example, for swiping screens, images and user interface panels left, right, up, and down.

In some embodiments, by utilizing the remote controller, the user of the mobile device can perform a scrolling action to scroll a portion of user interface of the mobile device in a situation when the scrolling functionality is available. The scrolling action can include scrolling up, down, left or right an information text, a webpage, an image, and so on.

In some embodiments, by using the touchpad and the touchpad's click (pushing down a micro-switch beneath the touchpad), a user of the mobile device can type letters using a virtual keyboard in the mobile device's user interface, when the virtual keyboard is available.

In various embodiments, the remote control controller is sized to be small enough to comfortably fit in a user's hand. In an example embodiment, the remote control can be about 45 mm square with a depth of about 10.5 mm, though other suitable sizes and shapes may be used. In an example embodiment, two coin batteries may be used with a battery tray that slides out, optionally, in response to a pin or paper clip being inserted into an adjacent hole, in order to provide battery power to the remote controller.

Figure 5:
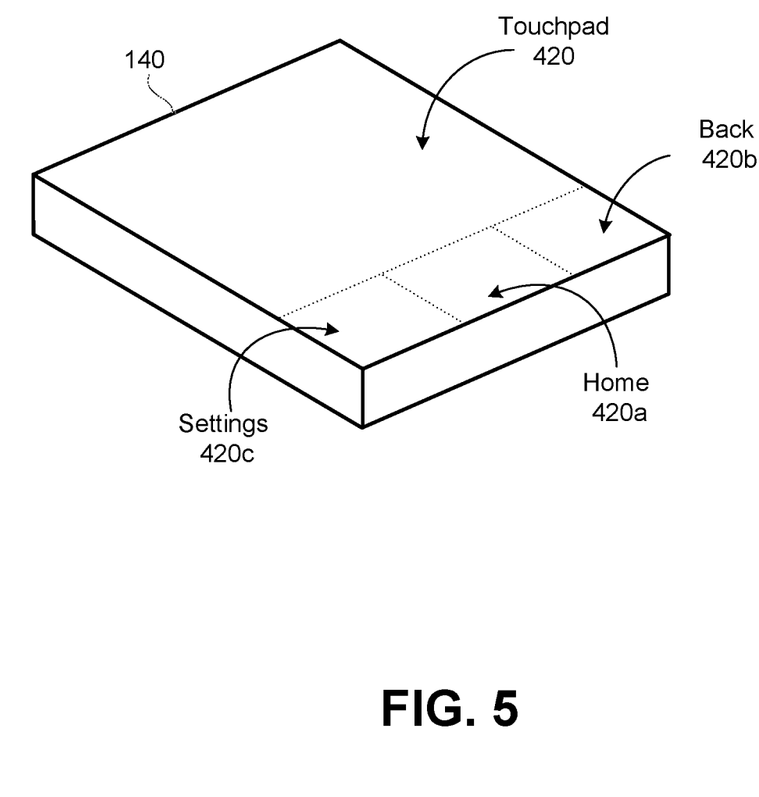
FIG. 5 is a block diagram showing an example shape of a remote controller.

In some embodiments, the remote controller allows a user to remotely access the primary Android buttons (Home, Back, Application launcher) of the mobile phone. In some embodiments, the buttons of the mobile device are activated via three specific touch-sensitive areas 420a, 420b, and 420c located on the remote control touchpad 420 as shown in FIG. 5. The three touch-sensitive areas 420a, 420b, and 420c correspond to three Android buttons. The user can access the three buttons on the mobile device by simultaneously pressing on the micro-switch located underneath the touchpad surface of the remote controller.

Figure 6:
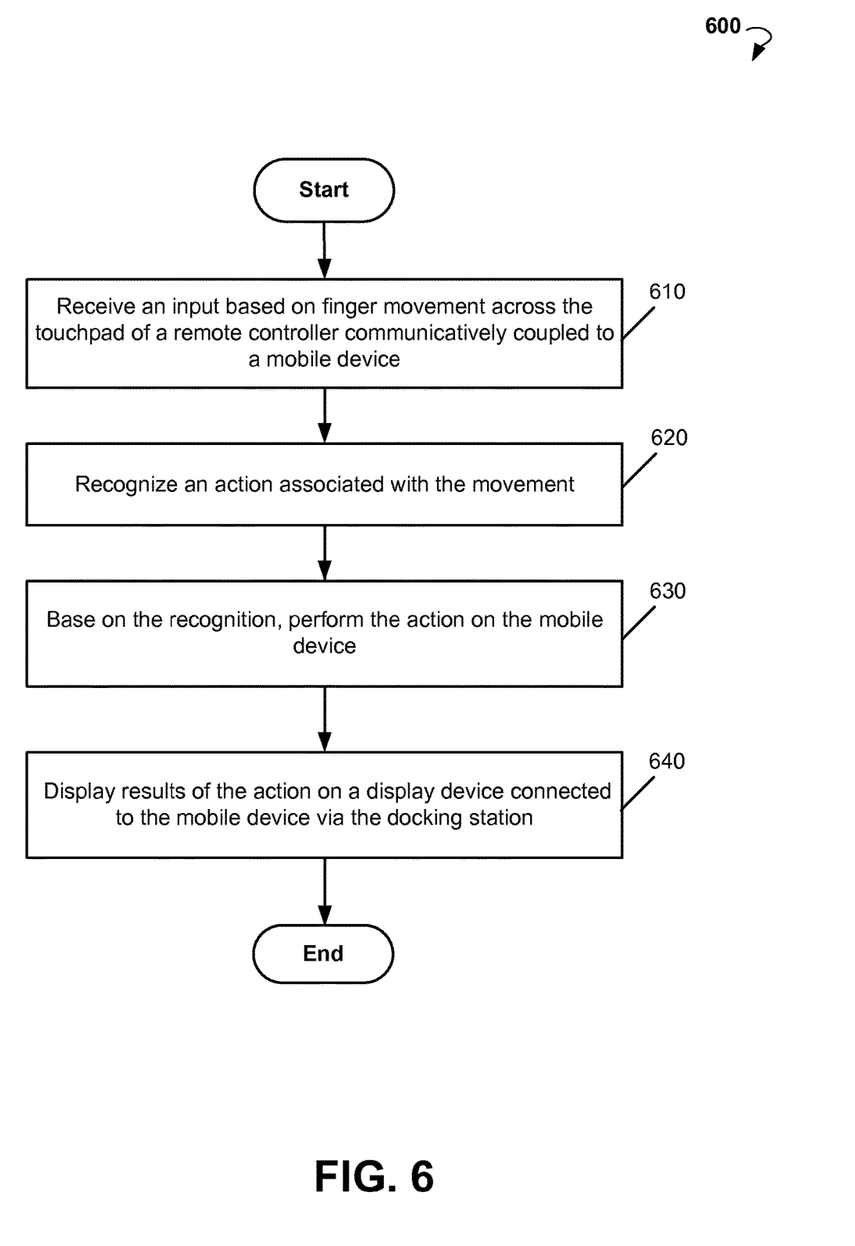
FIG. 6 is a flowchart showing steps of method for controlling a mobile device via a remote controller utilizing a charging dock, according to an example embodiment.

FIG. 6 is a flowchart showing steps of a method 600 for remote controlling a mobile device. The method can be performed using remote controller 110, mobile device 130, docking station 110, and display device 120. In block 610, the method 600 receives an input as a user pushes down on touchpad of a remote controller with a finger and moves the finger across the touchpad. The remote controller can be communicatively coupled to a mobile device. The mobile device can be connected to the docking station. In block 620, method 600 proceeds to recognize an action associated with the movement. In block 630, method 600 proceeds to perform the action on the mobile device. In block 640, the method 600 displays results of the action on the display device. The display device can be connected to the mobile device via a docking station. The display device can be configured to display a screen of the mobile device.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

What is claimed is:

1. A console unit for controlling a mobile device, the console unit comprising:
    a remote control unit having a top surface and a bottom surface, the remote control unit including a communications transceiver configured to communicate with the mobile device; and
    a tower-shaped section having a top portion, a bottom portion, and four sides, the top and the bottom portions being secured to the four sides, wherein the entirety of the top portion is a single receptacle adapted for physically receiving the entirety of the top surface or the bottom surface of the remote control unit,
    the remote control unit communicating with the mobile device that is physically coupled to an interface of the tower-shaped section, and in response to an input received from a user, the remote control unit initiating performance of an action on the mobile device that is physically coupled to the interface of the tower-shaped section,
    the tower-shaped section further including:
        the interface configured for coupling to the mobile device, the interface being configured for selectively receiving at least high definition media data from the mobile device;
        at least one media port for providing the at least high definition media data to at least one media player device; and
        a power port for coupling to a power source for receiving power.

2. The console unit of claim 1, wherein:
    the remote control unit includes a touchpad for receiving the input from the user while the mobile device is coupled to the tower-shaped section,
    the mobile device being configured to perform the action associated with the input received at the touchpad.

3. The console unit of claim 2, wherein the remote control unit includes one or more buttons for receiving the input from the user while the mobile device is coupled to the tower-shaped section.

4. The console unit of claim 3, wherein each of the one or more buttons is associated with at least one standard Android button.

5. The console unit of claim 2, wherein the touchpad includes sensitive areas, each sensitive area being associated with one standard Android button.

6. The console unit of claim 2, wherein the input comprises a gesture received by pushing the touchpad by a finger and moving the finger across the touchpad while keeping the touchpad depressed.

7. The console unit of claim 2, wherein the action associated with the input received at the touchpad of the remote control unit includes one or more of the following:
    swiping at least one screen associated with a user interface of the mobile device;
    scrolling a portion of the at least one screen associated with the user interface of the mobile device; and
    typing letters on a virtual keyboard provided by the user interface of the mobile device.

8. The console unit of claim 1, wherein the interface includes a cable having one end coupled to the tower-shaped section, the cable having a second end including a USB protocol connector for coupling to the mobile device.

9. The console unit of claim 1, wherein the interface is further configured for selectively receiving USB protocol data and the at least high definition media data from the mobile device;
    the tower-shaped section further including a USB data port configured for coupling to one or more USB compatible devices, the one or more USB compatible devices including at least one of a keyboard and a pointing device; and
    the USB data port being for communicating the USB protocol data between the mobile device and the one or more USB compatible devices.

10. The console unit of claim 1, wherein the tower-shaped section includes two media ports, the two media ports being selected from:
    one or more HDMI ports configured for coupling to a respective HDMI compatible device; and
    one or more USB ports for coupling to a respective USB compatible device.

11. The console unit of claim 1, wherein at least one of the power port, the at least one media port, and the interface comprises at least one of a USB connector, an HDMI connector, and a DisplayPort connector.

12. The console unit of claim 1, wherein the interface is further configured for charging the mobile device.

13. The console unit of claim 1, wherein the tower-shaped section is configured to charge the remote control unit located in the single receptacle.

14. The console unit of claim 13, wherein the remote control unit is charged wirelessly.

15. The console unit of claim 1, wherein the remote control unit is configured to communicate with the mobile device via one of Bluetooth and WiFi wireless protocols.

16. The console unit of claim 1, wherein the at least one media player device is configured to provide a video of a screen of the mobile device while the mobile device is coupled to the tower-shaped section.

17. A method for controlling a mobile device using a console unit, the console unit comprising:
a remote control unit including a communications transceiver configured to communicate with the mobile device; and
a tower-shaped section having a top portion, a bottom portion, and four sides, the top and the bottom portions being secured to the four sides, wherein the entirety of the top portion is a single receptacle adapted for physically receiving the remote control unit at least partially therein, the remote control unit communicating with the mobile device that is physically coupled to an interface of the tower-shaped section, and in response to an input received from a user, the remote control unit initiating performance of an action on the mobile device that is physically coupled to the interface of the tower-shaped section,
the tower-shaped section further including:
the interface configured for coupling to the mobile device, the interface being configured for selectively receiving high definition media data and USB protocol data from the mobile device, the interface being further configured for charging the mobile device;
at least one media port for providing the high definition media data to at least one media player device; and
a power port for coupling to a power source for receiving power;
the method comprising:
receiving, via the remote control unit, the input from the user while the mobile device is connected to the tower-shaped section;
recognizing the action associated with the input;
causing, at least in part, performance of the action on the mobile device; and
causing, at least in part, display of a result of the action via the at least one media player device.

18. The method of claim 17, wherein the remote control unit includes a touchpad for receiving the input from the user.

19. The method of claim 18, wherein the input is a gesture received from the user that comprises: depressing the touchpad by a finger and then moving the finger across the touchpad while keeping the touchpad depressed.

20. The method of claim 17, the remote control unit initiating performance of the action on the mobile device, wherein the action includes one or more of the following:
swiping screens associated with a user interface of the mobile device;
scrolling a portion of the screen associated with the user interface of the mobile device; and
typing a letter of a virtual keyboard provided by the user interface of the mobile device.

21. A non-transitory processor-readable medium having embodied thereon a program being executable by at least one processor to perform a method for controlling a mobile device using a console unit, the console unit comprising:
a remote control unit having a top surface and a bottom surface, the remote control unit including a communications transceiver configured to communicate with a mobile device; and
a tower-shaped section having a top section, a bottom section, and four sides, the top and the bottom sections being secured to the four sides, wherein the entirety of the top section is a single receptacle for physically receiving the entirety of the top surface or the bottom surface of the remote control unit, the remote control unit communicating with the mobile device that is physically coupled to an interface of the tower-shaped section, and in response to an input received from a user, the remote control unit initiating performance of an action on the mobile device that is physically coupled to the interface of the tower-shaped section,
the tower-shaped section further including:
the interface configured for coupling to the mobile device, the interface configured for selectively receiving high definition media data and USB protocol data from the mobile device, the interface being further configured for charging the mobile device;
at least one media port for providing the high definition media data to at least one media player device; and
a power port for coupling to a power source for receiving power;
the method comprising:
receiving, via the remote control unit, the input from the user while the mobile device is connected to the tower-shaped section;
recognizing the action associated with the input;
causing, at least partially, performing of the action on the mobile device; and
causing, at least partially, displaying of results of the action via the at least one media player device.

* * * * *